United States Patent
Sano

(10) Patent No.: US 12,246,559 B2
(45) Date of Patent: Mar. 11, 2025

(54) PNEUMATIC TIRE

(71) Applicant: Toyo Tire Corporation, Itami (JP)

(72) Inventor: Shingo Sano, Itami (JP)

(73) Assignee: Toyo Tire Corporation, Itami (JP)

(*) Notice: Subject to any disclaimer, the term of this patent is extended or adjusted under 35 U.S.C. 154(b) by 121 days.

(21) Appl. No.: 17/542,745

(22) Filed: Dec. 6, 2021

(65) Prior Publication Data
US 2022/0194142 A1 Jun. 23, 2022

(30) Foreign Application Priority Data
Dec. 23, 2020 (JP) .................. 2020-213277

(51) Int. Cl.
*B60C 11/13* (2006.01)
*B60C 11/03* (2006.01)

(52) U.S. Cl.
CPC ...... *B60C 11/1323* (2013.01); *B60C 11/0309* (2013.01); *B60C 2011/0353* (2013.01); *B60C 2011/1338* (2013.01)

(58) Field of Classification Search
CPC ............... B60C 11/0309; B60C 11/125; B60C 11/1323; B60C 11/1353; B60C 2011/1338; B60C 2011/1361; B60C 11/1369
See application file for complete search history.

(56) References Cited

U.S. PATENT DOCUMENTS

| | | | |
|---|---|---|---|
| 4,217,942 A | 8/1980 | Takigawa et al. | |
| 4,296,789 A * | 10/1981 | Roberts | B60C 11/125 152/209.27 |
| 4,515,197 A * | 5/1985 | Motomura | B60C 11/125 152/209.27 |
| 5,160,385 A | 11/1992 | Goto et al. | |
| 9,302,548 B2 * | 4/2016 | Tanabe | B60C 11/1307 |
| 2012/0073715 A1* | 3/2012 | Kawauchi | B60C 11/0302 152/209.18 |

FOREIGN PATENT DOCUMENTS

| | | | |
|---|---|---|---|
| EP | 0230765 A1 * | 8/1987 | |
| EP | 0855292 A1 * | 7/1998 | |
| JP | S54-070503 A | 6/1979 | |
| JP | 60203504 A * | 10/1985 | |
| JP | S62155105 A | 7/1987 | |

(Continued)

OTHER PUBLICATIONS

English machine translation of JP-60203504-A. (Year: 1985).*

(Continued)

*Primary Examiner* — Robert C Dye
(74) *Attorney, Agent, or Firm* — WHDA, LLP

(57) ABSTRACT

A pneumatic tire includes a plurality of main grooves formed in a tread and extending along a tire circumferential direction, wherein the plurality of main grooves include a shoulder main groove located on an outermost side in a width direction, the shoulder main groove includes a raised portion formed by raising a first side, in the tire width direction, of a groove bottom of the shoulder main groove more than a second side of the groove bottom, and the raised portion is lower than an outer surface of the tread and continuously extends over an entire circumference in the tire circumferential direction.

9 Claims, 4 Drawing Sheets

(56) References Cited

FOREIGN PATENT DOCUMENTS

JP          2016-147598 A      8/2016

OTHER PUBLICATIONS

Office Action dated Mar. 22, 2024, issued in counterpart CN application No. 202111472697.9, with English translation. (25 pages).
Office Action dated Sep. 28, 2024, issued in counterpart CN application No. 202111472697.9, with English translation. (19 pages).
Office Action dated Aug. 28, 2024, issued in counterpart JP Application No. 2020-213277, with English translation. (5 pages).

* cited by examiner

PNEUMATIC TIRE

BACKGROUND OF THE INVENTION

Field of the Invention

The present disclosure relates to a pneumatic tire.

Description of the Related Art

Patent Document 1 below discloses a pneumatic tire including a main groove (hereinafter referred to as shoulder main groove) that is located on an outermost side of a ground contact surface in a tire width direction and extends in a tire circumferential direction; a lug groove that extends from the shoulder main groove to an outer side of a tire ground contact end; and a bottom-raised portion that includes a boundary leading to the shoulder main groove from the lug groove, is provided so as to stride over the shoulder main groove and the lug groove, and has a groove bottom raised. Providing the bottom-raised portion enables improvement in a rigidity of a corner of a block in a shoulder portion which is easily deformed. However, due to the bottom-raised portion being disposed intermittently in the tire circumferential direction together with the lug groove, the bottom-raised portion hardly contributes to improvement in traction performance. In addition, due to the bottom-raised portion being disposed intermittently, the rigidity of the corner of the block is not sufficient, and there is also room for improvement in irregular wear-resistant performance, particularly toe and heel wear-resistant performance.

PRIOR ART DOCUMENT

Patent Document
  Patent Document 1: JP-A-2016-147598

SUMMARY OF THE INVENTION

An object of the present disclosure is to provide a pneumatic tire capable of improving traction performance and irregular wear-resistant performance (toe and heel wear-resistant performance).

A pneumatic tire according to the present disclosure includes a plurality of main grooves formed in a tread and extending along a tire circumferential direction. The plurality of main grooves include a shoulder main groove located on an outermost side in a width direction. The shoulder main groove includes a raised portion formed by raising a first side, in the tire width direction, of a groove bottom of the shoulder main groove more than a second side of the groove bottom. The raised portion is lower than an outer surface of the tread and continuously extends over an entire circumference in the tire circumferential direction.

DETAILED DESCRIPTION OF THE PREFERRED EMBODIMENTS

Figure 1:
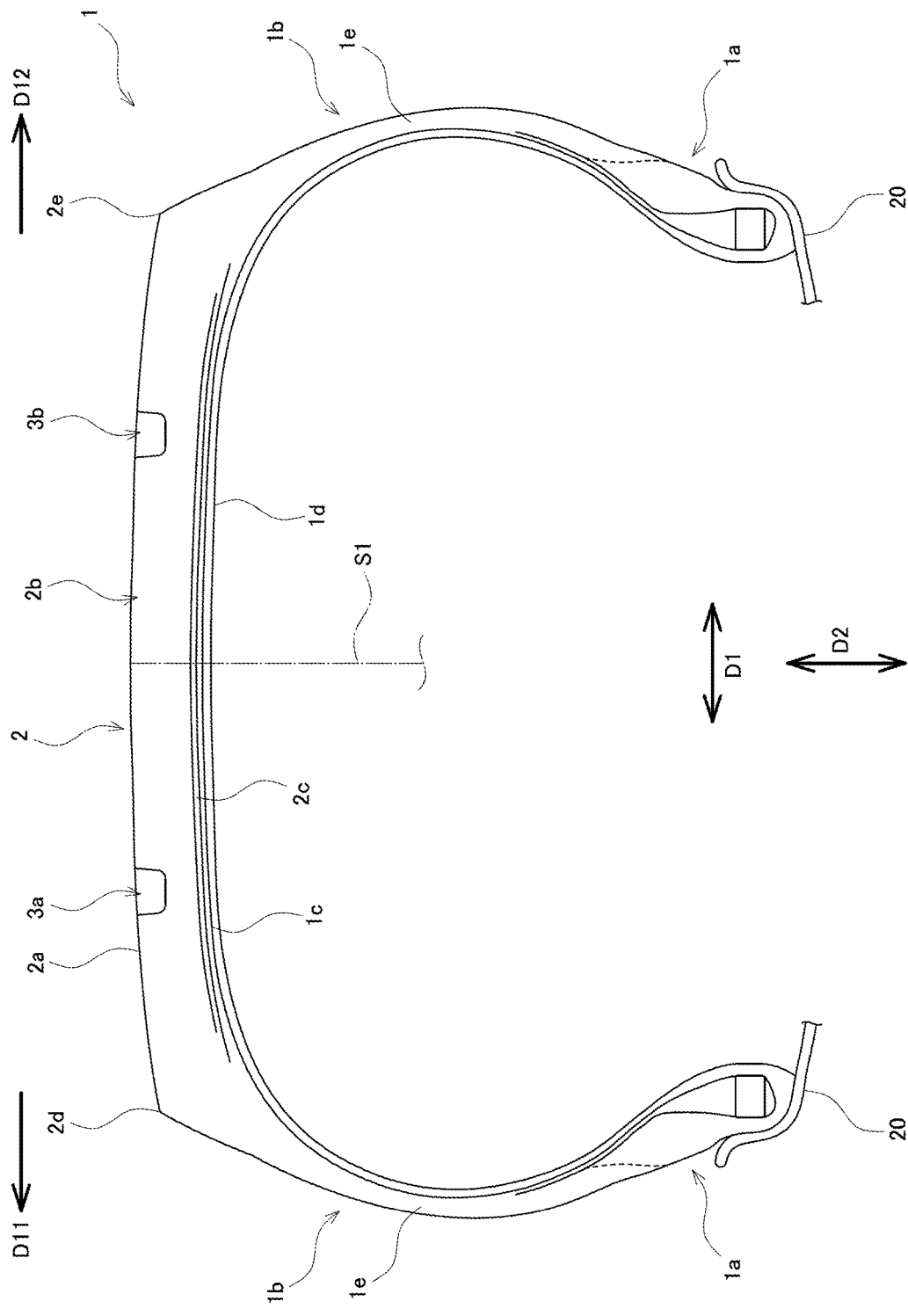
FIG. 1 is a cross-sectional view of a main part of a pneumatic tire according to the present embodiment on a tire meridian plane.

Hereinafter, an embodiment of a pneumatic tire will be described with reference to FIGS. 1 to 5. Note that a dimensional ratio of the drawing does not necessarily coincide with an actual dimensional ratio in each of the drawings, and dimensional ratios in the respective drawings do not necessarily coincide with each other.

In each of the drawings, a first direction D1 is a tire width direction D1 parallel to a tire rotation axis that is a rotation center of a pneumatic tire (hereinafter, also simply referred to as a "tire") 1, a second direction D2 is a tire radial direction D2 being a diameter direction of a tire 1, and a third direction D3 is a tire circumferential direction D3 around the tire rotation axis.

In the tire width direction D1, the inner side is a side close to a tire equatorial plane S1, and the outer side is a side far from the tire equatorial plane S1. In the tire width direction D1, a first side D11 is also referred to as a first width direction side D11, and a second side D12 is also referred to as a second width direction side D12. In the tire radial direction D2, the inner side is a side close to the tire rotation axis, and the outer side is a side far from the tire rotation axis.

The tire equatorial plane S1 is a plane orthogonal to the tire rotation axis and located at a center of the tire 1 in the tire width direction D1, and the tire meridian plane is a plane including the tire rotation axis and orthogonal to the tire equatorial plane S1. A tire equator line is a line along which the outer surface (a tread surface 2a to be described later) of the tire 1 in the tire radial direction D2 intersects with the tire equatorial plane S1.

As illustrated in FIG. 1, the tire 1 according to the present embodiment includes a pair of beads 1a having bead cores, sidewalls 1b extending outward in the tire radial direction D2 from the respective beads 1a, and a tread 2 connected to the outer ends of the pair of sidewalls 1b in the tire radial direction D2 and having an outer surface in the tire radial direction D2 that comes into contact with a road surface. In the present embodiment, the tire 1 is a pneumatic tire 1, in which air is introduced, and is mounted on a rim 20.

Further, the tire 1 includes a carcass 1c stretched between a pair of bead cores, and an inner liner 1d that is disposed inside the carcass 1c and has an excellent function of preventing permeation of gas in order to maintain the air pressure. The carcass 1c and the inner liner 1d are disposed along the tire inner circumference over the bead 1a, the sidewall 1b, and the tread 2.

The tread 2 includes a tread rubber 2b having a tread surface 2a that comes into contact with a road surface, and a belt 2c disposed between the tread rubber 2b and the carcass 1c. The tread surface 2a has a ground contact surface that actually comes into contact with the road surface, and the outer ends of the ground contact surface in the tire width direction D1 are referred to as ground contact ends 2d, 2e. Note that the ground contact surface refers to the tread surface 2a that comes into contact with a flat road surface when the tire 1 is mounted on the normal rim 20 and when the tire 1 is placed perpendicularly to the road surface in a state where the tire 1 is filled with a normal internal pressure, and a normal load is applied.

In a standard system including a standard on which the tire 1 is based, the normal rim 20 is a rim 20 defined for each tire 1 by the standard and is, for example, a standard rim in the case of the Japan Automobile Tyre Manufacturers Association (JATMA), "Design Rim" in the case of the Tire and Rim Association, Inc. (TRA), or "Measuring Rim" in the case of the European Tyre and Rim Technical Organisation (ETRTO).

The normal internal pressure is an air pressure defined for each tire 1 by each standard in the standard system including the standard on which the tire 1 is based. The normal internal pressure is the maximum air pressure in the case of JATMA, the maximum value described in Table "TIRE LOAD LIMITS AT VARIOUS COLD INFLATION PRESSURES" in the case of TRA, and "INFLATION PRESSURE" in the case of ETRTO, and when the tire 1 is for a passenger car, the normal internal pressure is set to 180 kPa.

The normal load is a load defined for each tire 1 by each standard in the standard system including the standard on which the tire 1 is based. The normal load is the maximum load capacity in the case of JATMA, the maximum value described in the above table in the case of TRA, and "LOAD CAPACITY" in the case of ETRTO, and when the tire 1 is for a passenger car, the normal load is 85% of the corresponding load of the internal pressure of 180 kPa.

Figure 2:
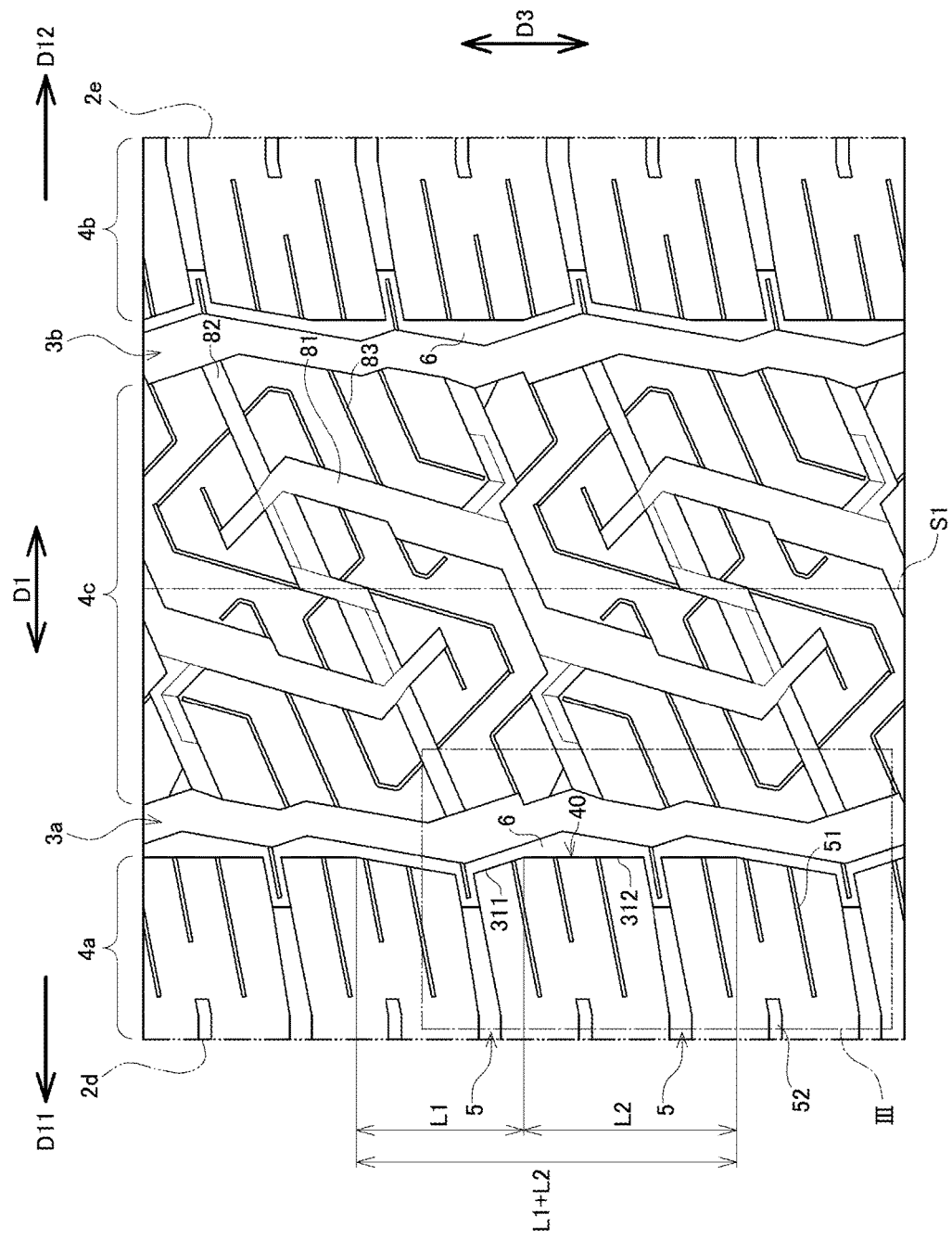
FIG. 2 is a front view of the pneumatic tire according to the present embodiment.
Figure 3:
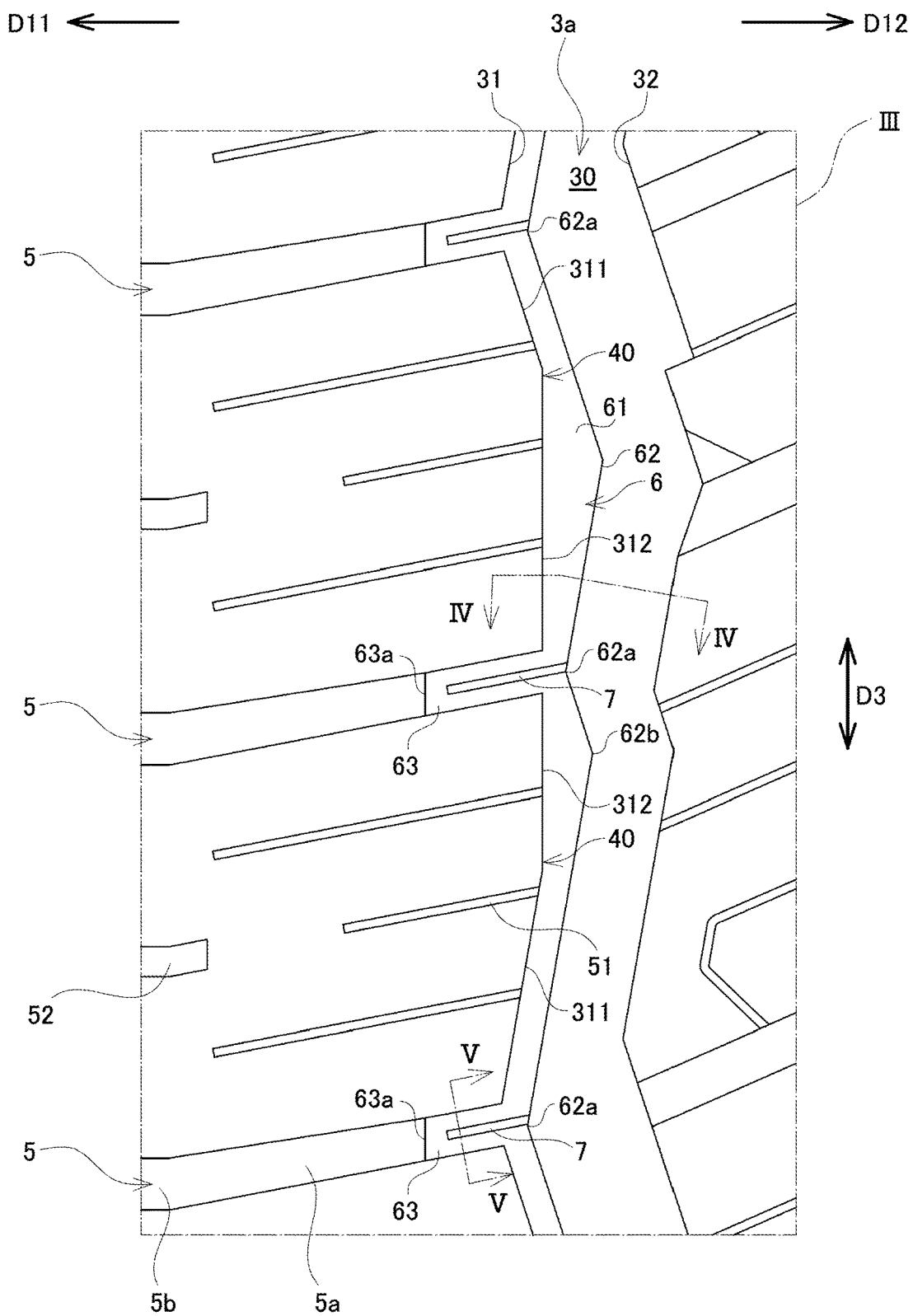
FIG. 3 is an enlarged view of a region III in FIG. 2.

As illustrated in FIGS. 1 and 2, the tread rubber 2b includes a plurality of main grooves 3a, 3b extending in the tire circumferential direction D3. The main grooves 3a, 3b extend continuously in the tire circumferential direction D3. The main grooves 3a, 3b extend in a zigzag shape by repeating bending. Although the number of the main grooves 3a, 3b is not particularly limited, the number is two in the present embodiment.

The main grooves 3a, 3b may include, for example, a portion that is a so-called tread wear indicator (not illustrated) where the groove has been made shallow such that a degree of wear can be seen by exposure accompanied by wear. For example, the main grooves 3a, 3b may have a groove width of 3% or more of a distance (dimension in the tire width direction D1) between the ground contact ends 2d, 2e. For example, the main grooves 3a, 3b may have a groove width of 5 mm or more.

Among the plurality of main grooves 3a, 3b, the pair of main grooves 3a, 3b disposed on the outermost side in the tire width direction D1 is referred to as shoulder main grooves 3a, 3b. When three or more main grooves are provided, the main groove disposed between the pair of shoulder main grooves 3a, 3b is referred to as a center main groove. The center main groove may extend straight or zigzag.

The tread rubber 2b includes a plurality of lands 4a to 4c defined by the plurality of main grooves 3a, 3b and the pair of ground contact ends 2d, 2e. Although the number of the lands 4a to 4c is not particularly limited, the number is three in the present embodiment.

The lands 4a, 4b defined by the shoulder main grooves 3a, 3b and the ground contact ends 2d and 2e are referred to as shoulder lands 4a, 4b, and the land 4c defined by the shoulder main grooves 3a, 3b is referred to as a center land 4c.

The shoulder land 4a includes a plurality of lateral grooves 5 extending from the shoulder main groove 3a toward the first width direction side D11. The lateral groove 5 is open to the shoulder main groove 3a. The shoulder land 4a includes a plurality of shoulder blocks 40 divided in the tire circumferential direction D3 by the plurality of lateral grooves 5.

The lateral groove 5 includes a first portion 5a extending in a direction inclined with respect to the tire width direction D1 and a second portion 5b extending parallel to the tire width direction D1. The groove width of the lateral groove 5 is, for example, 3.8 mm to 6.6 mm. The groove depth of the lateral groove 5 is, for example, 8.9 mm to 9.7 mm.

The shoulder land 4a includes sipes 51. The sipe 51 extends parallel to the first portion 5a of the lateral groove 5. One end of the sipe 51 is opened to the shoulder main groove 3a, and the other end is terminated in the shoulder block 40. The shoulder land 4a includes a width groove 52. The width groove 52 extends along the tire width direction D1. In the present specification, the "sipe" means a groove having a width dimension of less than 1.6 mm on the tread surface 2a. Further, in the present specification, "parallel" includes not only the case of being completely parallel but also the case of being substantially parallel with an intersection angle being 5 degrees or less (the same applies hereinafter).

The shoulder main groove 3a includes a groove bottom 30, a groove wall 31 on the first width direction side D11, and a groove wall 32 on the second width direction side D12.

The groove wall 32 on the second width direction side D12 extends in a zigzag shape along the tire circumferential direction D3. On the other hand, the groove wall 31 on the first width direction side D11 includes a bent portion 311 bent and extending so as to be parallel to the opposing groove wall 32, and a flat portion 312 extending parallel to the tire circumferential direction D3. The bent portion 311 and the flat portion 312 are disposed adjacent to each other. By the groove wall 31 including the flat portion 312, irregular wear-resistant performance (toe and heel wear-resistant performance) is improved compared to a case where the groove wall 31 has a zigzag shape as a whole, similarly to the groove wall 32.

A length L2 of the flat portion 312 is preferably 50% or more of a total length L1+L2 of a length L1 of the bent portion 311 and a length L2 of the flat portion 312 (cf. FIG. 2). By setting the length L2 to be 50% or more of the length L1+L2, the irregular wear-resistant performance is further improved. Here, the length L1 and the length L2 are lengths in the tire circumferential direction D3.

The shoulder main groove 3a includes a raised portion 6 formed by raising the first width direction side D11 of the groove bottom 30 more than the second width direction side D12. The raised portion 6 continuously extends over the entire circumference in the tire circumferential direction D3. The raised portion 6 has a top surface 61 parallel to the tread surface 2a and an outer surface 62 parallel to the groove wall 31. The groove wall 31 is an exposed wall surface on the outer side in the tire radial direction D2 with respect to the raised portion 6.

Figure 4:
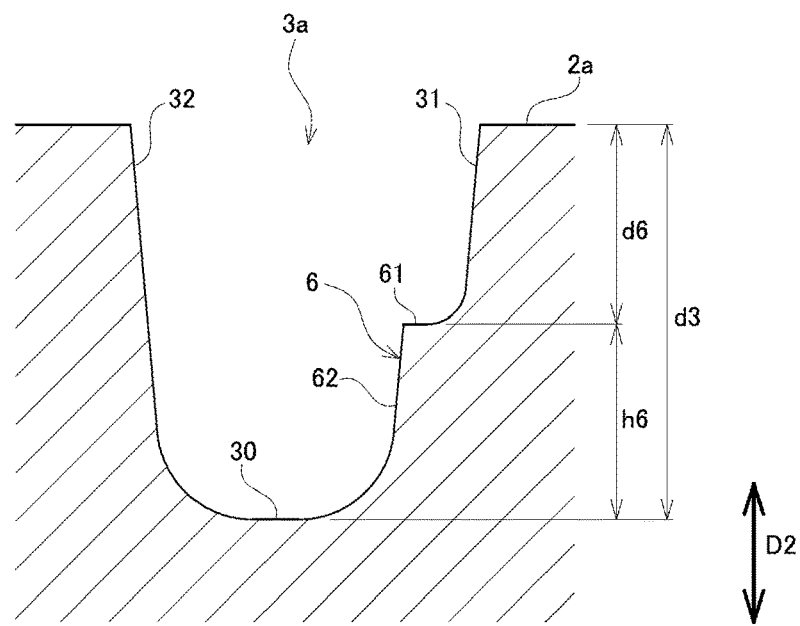
FIG. 4 is an enlarged cross-sectional view of a main part taken along line IV-IV in FIG. 3.
Figure 5:
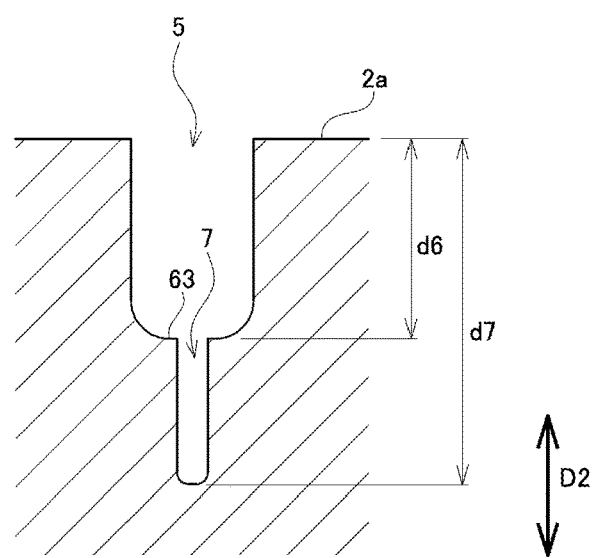
FIG. 5 is an enlarged cross-sectional view of a main part taken along line V-V in FIG. 3.

As illustrated in FIG. 4, the top surface 61 of the raised portion 6 is lower than the tread surface 2a. A depth d6 from the tread surface 2a to the top surface 61 is, for example, 6.0 mm to 7.0 mm. The depth d6 is constant throughout the raised portion 6, but is not limited thereto. By providing the shoulder main groove 3a with the raised portion 6, traction performance can be improved by a step of the raised portion 6. The traction performance can be further improved by continuously providing the raised portion 6 over the entire circumference. Furthermore, by providing the raised portion 6, the rigidity of the shoulder block 40 adjacent to the raised portion 6 can be enhanced, and the deformation of the surface shape of the main groove can be prevented. Accordingly, the toe and heel wear of the shoulder block 40 can be reduced.

A height h6 of the raised portion 6 from the groove bottom 30 is preferably 10% to 50% of a groove depth d3 of the shoulder main groove 3a. By setting the height h6 of the raised portion 6 within this range, it is possible to improve the traction performance and irregular wear-resistant performance while preventing deterioration in a drainage performance of the shoulder main groove 3a.

The outer surface 62 of the raised portion 6 on the second width direction side D12 extends in a zigzag shape along the tire circumferential direction D3. The outer surface 62 is bent and extends so as to be parallel to the opposing groove wall 32 of the shoulder main groove 3a. By forming the outer surface 62 in a zigzag shape, the traction performance can be improved by the bent edge of the outer surface 62.

A first bending point 62a of the outer surface 62 protruding toward the first width direction side D11 is adjacent to the opening of the lateral groove 5 in the tire width direction D1. A second bending point 62b of the outer surface 62 protruding toward the second width direction side D12 faces the flat portion 312 of the shoulder main groove 3a in the tire width direction D1.

The raised portion 6 includes an extended portion 63 extending in the lateral groove 5. The depth from the tread surface 2a to the top surface of the extended portion 63 is the same as the depth d6 from the tread surface 2a to the top surface 61 of the raised portion 6. The width of the extended portion 63 is the same as the groove width of the lateral groove 5. The extended portion 63 extends to an intermediate portion of the first portion 5a of the lateral groove 5. Ends 63a of the plurality of extended portions 63 are disposed at the same position in the tire width direction D1 and are linearly arranged in the tire circumferential direction D3.

The extended portion 63 includes a sipe 7 extending along a direction in which the lateral groove 5 extends. One end of the sipe 7 is opened to the shoulder main groove 3a, and the other end of the sipe 7 is terminated in the extended portion 63. Thus, the raised portion 6 is continuous in the tire circumferential direction D3 without being divided by the sipe 7. The sipe 7 is disposed at the center of the width of the extended portion 63. By providing the sipe 7 in the extended portion 63, it is possible to prevent the rigidity of the corner of the shoulder block 40 from becoming excessively high due to the extended portion 63 and to prevent deterioration in the grip of the tire.

A groove depth d7 of the sipe 7 is shallower than the groove depth d3 of the shoulder main groove 3a. When the sipe 7 is excessively deep, the sipe 7 may cause a crack. The sipe 7 of the present embodiment has a groove width of 0.8 mm and a groove depth of 8.0 mm to 8.5 mm.

As illustrated in FIG. 2, the center land 4c includes a plurality of circumferential grooves 81 extending along the tire circumferential direction D3, a plurality of width grooves 82 extending along the tire width direction D1, and a plurality of sipes 83. The circumferential groove 81 and the width groove 82 intersect each other.

As described above, the pneumatic tire 1 according to the present embodiment includes the plurality of main grooves 3a, 3b formed in the tread 2 and extending along the tire circumferential direction D3. The plurality of main grooves 3a, 3b include the shoulder main groove 3a located on the outermost side in the tire width direction D1. The shoulder main groove 3a includes the raised portion 6 formed by raising the first side D11, in the tire width direction D1, of the groove bottom 30 of the shoulder main groove 3a more than the second side D12. The raised portion 6 is lower than the outer surface 2a of the tread 2 and continuously extends over the entire circumference in the tire circumferential direction D3.

With this configuration, by providing the raised portion 6 in the shoulder main groove 3a, the traction performance can be improved by the step of the raised portion 6. The traction performance can be further improved by continuously providing the raised portion 6 over the entire circumference. Furthermore, by continuously providing the raised portion 6 over the entire circumference, the rigidity of the shoulder block 40 adjacent to the raised portion 6 can be sufficiently enhanced, and the irregular wear-resistant performance (toe and heel wear-resistant performance) can be improved.

In the pneumatic tire 1 according to the present embodiment, the outer surface 62 of the raised portion 6 on the second side D12 in the tire width direction extends in a zigzag shape along the tire circumferential direction D3.

With this configuration, by the outer surface 62 having the zigzag shape, the traction performance can be improved by the bent edge of the outer surface 62.

In the pneumatic tire 1 according to the present embodiment, the groove wall 32 of the shoulder main groove 3a on the second side D12 in the tire width direction extends in a zigzag shape along the tire circumferential direction D3, and the groove wall 31 of the shoulder main groove 3a on the first side D11 in the tire width direction includes the flat portion 312 extending parallel to the tire circumferential direction D3.

With this configuration, the irregular wear-resistant performance is improved compared to a case where both groove walls 31, 32 are formed in a zigzag shape.

In the pneumatic tire 1 according to the present embodiment, the first side D11 in the tire width direction is the outer side in the tire width direction D1.

With this configuration, the toe and heel wear of the shoulder block 40 located outside the shoulder main groove 3a in the tire width direction D1 can be reduced.

In the pneumatic tire 1 according to the present embodiment, the shoulder land 4a defined by the shoulder main groove 3a and the ground contact end 2d includes the plurality of lateral grooves 5 extending from the shoulder main groove 3a toward the first side D11 in the tire width direction, the raised portion 6 includes the extended portion 63 extending in the lateral grooves 5, and the extended portion 63 includes the sipe 7 extending along the direction in which the lateral groove 5 extends.

With this configuration, deterioration in the grip of the tire due to the extended portion 63 can be prevented, and traction at the groove bottom and a drainage property after the wear can be ensured.

Note that the pneumatic tire 1 is not limited to the configuration of the embodiment described above or is not limited to the operation and effect described above. It is needless to say that various modifications can be made to the pneumatic tire 1 within a range not departing from the gist of the present invention. For example, the configuration, the method, and the like of each of the plurality of embodiments described above may be arbitrarily adopted and combined, and it is a matter of course that one or more configurations, methods, and the like according to various modification examples described below may be arbitrarily selected and adopted in the configuration, method, and the like according to the embodiment described above.

(1) In the pneumatic tire 1 according to the above embodiment, the outer surface 62 of the raised portion 6 on the second side D12 in the tire width direction extends in a zigzag shape along the tire circumferential direction D3. However, the pneumatic tire 1 is not limited to such a configuration. For example, even when the outer surface 62 of the raised portion 6 extends linearly in the tire circumferential direction D3, the traction performance and the irregular wear-resistant performance can be improved.

(2) In the pneumatic tire 1 according to the above embodiment, the groove wall 32 of the shoulder main groove 3a on the second side D12 in the tire width direction extends in a zigzag shape along the tire circumferential direction D3, and the groove wall 31 of the shoulder main groove 3a on the first side D11 in the tire width direction includes the flat portion 312 extending parallel to the tire circumferential direction D3. However, the pneumatic tire 1 is not limited to such a configuration. For example, the groove wall 31 on the first side D11 in the tire width direction of the shoulder main groove 3a may not include the flat portion 312 and may extend in a zigzag shape along the tire circumferential direction D3, similarly to the groove wall 32 on the second side D12 in the tire width direction. The groove wall 31 of the shoulder main groove 3a on the first side D11 in the tire width direction may not include the bent portion 311 and may extend parallel to the tire circumferential direction D3 as a whole.

(3) In the pneumatic tire 1 according to the above embodiment, the first side D11 in the tire width direction is the outer side in the tire width direction D1. However, the pneumatic tire 1 is not limited to such a configuration. For example, the tire width direction first side D11 may be an inner side in the tire width direction D1. That is, the raised portion 6 may be provided adjacent to the center land 4c.

(4) In the pneumatic tire 1 according to the above embodiment, the shoulder land 4a defined by the shoulder main groove 3a and the ground contact end 2d includes the plurality of lateral grooves 5 extending from the shoulder main groove 3a toward the first side D11 in the tire width direction, the raised portion 6 includes the extended portion 63 extending in the lateral grooves 5, and the extended portion 63 includes the sipe 7 extending along the direction in which the lateral groove 5 extends. However, the pneumatic tire 1 is not limited to such a configuration. For example, the sipe 7 may not be provided in the extended portion 63, and the extended portion 63 itself may not be provided.

(5) Although the shoulder main groove 3a has been described in the above embodiment, the tire 1 of the present embodiment is a tire, the mounting direction of which to a vehicle is not designated, and the shoulder main groove 3b and the shoulder main groove 3a have the same shape. Hence, it is preferable that the raised portions 6 be also provided in the same shape in both the shoulder main grooves 3a, 3b. However, the present embodiment can also be applied to a tire having a so-called asymmetric pattern, the mounting direction of which to a vehicle is not designated. At that time, the raised portion 6 may be provided in any one of the shoulder main grooves 3a, 3b, the shape of the raised portion 6 may be made different between the shoulder main grooves 3a, 3b, or the depth d6 from the tread surface 2a to the top surface 61 may be made different between the shoulder main grooves 3a, 3b.

What is claimed is:

1. A pneumatic tire comprising a plurality of main grooves formed in a tread and extending along a tire circumferential direction, wherein
the plurality of main grooves include a shoulder main groove located on an outermost side in a width direction,
the shoulder main groove includes a first side, a second side, a groove bottom between the first side and the second side, and a raised portion, the first side and the second side being on opposite sides in the tire width direction,
the raised portion is formed by raising the first side more than the second side and the raised portion is formed only on the first side,
the raised portion is lower than an outer surface of the tread and continuously extends over an entire circumference in the tire circumferential direction,
a shoulder land defined by the shoulder main groove and a ground contact end includes a plurality of lateral grooves extending from the shoulder main groove toward the outer side in the tire width direction, and
the raised portion includes an extended portion extended into each of the lateral grooves, the extended portion terminating each of the lateral grooves to form a non-raised portion in each of the lateral grooves.

2. The pneumatic tire according to claim 1, wherein an outer surface of the raised portion facing the second side in the tire width direction extends in a zigzag shape along the tire circumferential direction.

3. The pneumatic tire according to claim 2, wherein an outer surface of the raised portion facing the second side in the tire width direction is bent and extends so as to be parallel to the groove wall of the shoulder main groove on the second side in the tire width direction.

4. The pneumatic tire according to claim 1, wherein
a groove wall of the shoulder main groove on the second side in the tire width direction extends in a zigzag shape along the tire circumferential direction, and
a groove wall of the shoulder main groove on the first side in the tire width direction includes a flat portion extending parallel to the tire circumferential direction.

5. The pneumatic tire according to claim 4, wherein
the groove wall of the shoulder main groove on the first side in the tire width direction includes a bent portion that is bent and extends so as to be parallel to the groove wall of the shoulder main groove on the second side in the tire width direction, and
a length of the flat portion is 50% or more of a total length of a length of the bent portion and the length of the flat portion.

6. The pneumatic tire according to claim 1, wherein the first side in the tire width direction is an outer side in the tire width direction.

7. The pneumatic tire according to claim 1, wherein
the extended portion includes a sipe extending along a direction in which each respective one of the lateral grooves extends.

8. The pneumatic tire according to claim 7, wherein one end of the sipe is opened to the shoulder main groove, and the other end of the sipe is terminated in the extended portion.

9. The pneumatic tire according to claim 1, wherein a height of the raised portion from the groove bottom of the shoulder main groove is 10% to 50% of a groove depth of the shoulder main groove.

* * * * *